United States Patent
Attfield et al.

(10) Patent No.: US 9,930,071 B2
(45) Date of Patent: Mar. 27, 2018

(54) SYSTEM AND METHODS FOR SECURE UTILIZATION OF ATTESTATION IN POLICY-BASED DECISION MAKING FOR MOBILE DEVICE MANAGEMENT AND SECURITY

(71) Applicant: Sequitur Labs, Inc., Issaquah, WA (US)

(72) Inventors: Philip Attfield, Fall City, WA (US); Paul Chenard, Corvallis, OR (US); Simon Curry, Chelmsford, MA (US); Vincent Ting, Vancouver (CA); Mark Reed, Redmond, WA (US); David Baar, Vancouver (CA)

(73) Assignee: Sequitur Labs, Inc., Issaquah, WA (US)

( * ) Notice: Subject to any disclaimer, the term of this patent is extended or adjusted under 35 U.S.C. 154(b) by 0 days.

(21) Appl. No.: 15/157,755

(22) Filed: May 18, 2016

(65) Prior Publication Data

US 2017/0026415 A1 Jan. 26, 2017

Related U.S. Application Data (63) Continuation of application No. 14/062,849, filed on Oct. 24, 2013, now Pat. No. 9,411,962, which is a
(Continued)

(51) Int. Cl.
*H04L 29/06* (2006.01)
*G06F 21/57* (2013.01)
(Continued)

(52) U.S. Cl.
CPC .............. *H04L 63/20* (2013.01); *G06F 21/51* (2013.01); *G06F 21/53* (2013.01); *G06F 21/57* (2013.01);
(Continued)

(58) Field of Classification Search
None
See application file for complete search history.

(56) References Cited

U.S. PATENT DOCUMENTS

| 5,881,225 A | 3/1999 | Worth |
| 7,140,035 B1 | 11/2006 | Karch |

(Continued)

FOREIGN PATENT DOCUMENTS

| WO | WO 2015/095352 | 6/2014 |
| WO | WO 2015/026389 | 2/2015 |

(Continued)

OTHER PUBLICATIONS

"Computer Architecture: A Quantitative Approach", Hennessy J. and Patterson, D., 5th Ed. Morgan Kaufman (2011).
(Continued)

*Primary Examiner* — Hadi Armouche
*Assistant Examiner* — Andrew Steinle
(74) *Attorney, Agent, or Firm* — LaRiviere, Grubman PC (57) ABSTRACT

Policy-based client-server systems and methods for attestation in managing and securing mobile computing devices. Attestation provides the means to make efficient, secure, and reproducible use of knowledge possessed by trusted expert parties and authorities within the expression and enforcement of policies for controlling use of, and access to, onboard software and hardware, network capabilities, and remote assets and services. Aspects of secure attestation of applications that use shared and dynamically loaded libraries are presented, as well as potential business models for attestation used in such a policy-based system. The system of the present invention resolves attestation record conflicts using digital certificates and digital signatures.

6 Claims, 6 Drawing Sheets

Related U.S. Application Data continuation-in-part of application No. 13/945,677, filed on Jul. 18, 2013.

(51) Int. Cl.

| | | |
|---|---|---|
| *G06F 21/51* | (2013.01) | |
| *G06F 21/53* | (2013.01) | |
| *H04W 12/10* | (2009.01) | |
| *H04W 12/06* | (2009.01) | |
| *G06F 21/62* | (2013.01) | |
| *G06F 21/60* | (2013.01) | |
| *H04W 12/12* | (2009.01) | |

(52) U.S. Cl.
 CPC ...... *H04L 63/0823* (2013.01); *H04L 63/1433* (2013.01); *H04W 12/06* (2013.01); *H04W 12/10* (2013.01); *G06F 21/606* (2013.01); *G06F 21/6209* (2013.01); *G06F 2221/2101* (2013.01); *H04L 63/06* (2013.01); *H04W 12/12* (2013.01)

(56) References Cited

U.S. PATENT DOCUMENTS

| | | | |
|---|---|---|---|
| 7,246,233 | B2 | 7/2007 | Brabson et al. |
| 7,640,429 | B2 | 12/2009 | Huang et al. |
| 8,127,982 | B1 | 3/2012 | Casey et al. |
| 8,285,249 | B2 | 10/2012 | Baker et al. |
| 8,463,819 | B2 | 6/2013 | Shashikumar et al. |
| 8,468,586 | B2 | 6/2013 | Koottayi et al. |
| 2005/0132202 | A1* | 6/2005 | Dillaway ............... H04L 9/0825 713/179 |
| 2005/0193196 | A1* | 9/2005 | Huang ................. G06F 21/6218 713/166 |
| 2009/0089125 | A1 | 4/2009 | Sultan |
| 2009/0100269 | A1* | 4/2009 | Naccache ............. H04L 9/3271 713/186 |
| 2009/0205016 | A1 | 8/2009 | Milas |
| 2011/0107089 | A1* | 5/2011 | Koottayi ............... H04L 63/102 713/156 |
| 2013/0029653 | A1 | 1/2013 | Baker et al. |
| 2013/0080411 | A1* | 3/2013 | Rolia .................. G06F 17/3089 707/694 |
| 2013/0253942 | A1 | 9/2013 | Liu et al. |
| 2013/0298664 | A1 | 11/2013 | Gillette, II |
| 2014/0115659 | A1 | 4/2014 | Attfield et al. |
| 2015/0358822 | A1 | 12/2015 | Hendrick et al. |

FOREIGN PATENT DOCUMENTS

| | | |
|---|---|---|
| WO | WO 2015/157424 | 10/2015 |
| WO | WO 2016010602 | 1/2016 |
| WO | WO 2015/037048 | 3/2016 |
| WO | WO 2016057791 | 4/2016 |

OTHER PUBLICATIONS

"Computer Networks", Tanenbaum, A. Andrew and Wetherall, D., 5th Ed. Prentice Hall (2010).

"Prolog Programming: A First Course", Brna, P. (Mar. 5, 2001). Retrieved from <http://homepages.inf.ed.ac.uk/obrna/prolog book/> on Mar. 16, 2013.

* cited by examiner

SYSTEM AND METHODS FOR SECURE UTILIZATION OF ATTESTATION IN POLICY-BASED DECISION MAKING FOR MOBILE DEVICE MANAGEMENT AND SECURITY

PRIORITY CLAIM

This application is a continuation of U.S. application Ser. No. 14/062,849 filed Oct. 24, 2013, which is a continuation-in-part of U.S. application Ser. No. 13/945,677 filed on Jul. 18, 2013. This application incorporates the disclosures of all applications mentioned in this paragraph by reference as if fully set forth herein.

COPYRIGHT STATEMENT

All material in this document, including the figures, is subject to copyright protections under the laws of the United States and other countries. The owner has no objection to the reproduction of this document or its disclosure as it appears in official governmental records. All other rights are reserved.

TECHNICAL FIELD

Related technical field(s) are: Telecommunications, Digital Communication, Computer Technology, and IT Methods for Management.

BACKGROUND ART

Attestation by trusted entities plays a number of key roles in computing security and information security and information access management. Typically, a party with some degree of authority or trust will state that an entity or software application can be trusted to perform certain operations on specific information assets or on certain devices. Another party or device or software component will then consider such attestation in making a decision as to whether or not to allow an attempted or requested operation.

An antivirus vendor may have scanned a particular software application and has found that application to be free of known viruses and malware. Once the vendor as the attester makes that finding, a potential user of the software can proceed to install and execute the software with an increased degree of confidence that the software will not behave maliciously. Conversely, the antivirus vendor may have found malware in the scanned software, and the software may be blocked from installation or execution.

Some web-based services such as TUCOWS® by Tucows, Inc. and Download.com by CBS Interactive Inc., as well as application merchants screen applications for viruses before approving them for download by end users. While no formal technical standard is used, the availability of software for download by one of these parties' websites implies such approval, and is intrinsically a form of attestation with regard to the downloadable application.

PC firewalls such as ZONEALARM® by Check Point Software Technologies Ltd. use a simple form of attestation in that they ask a user whether or not to allow network access by a specific application. The user response to such a query, whether positive or negative in regard to allowing such access, is then immediately applied and can be applied again later to future uses of the same application. In this sense, the end user personally "attests" to whether the network access is benevolent and that attestation may be serialized for use again later. If a change is detected in the application, such as the installation of a different version of the application, or the application is modified in some other way, attestation is then effectively retracted and the user is asked again for permission for network access. In addition to this direct attestation by the end user, the firewall vendor may also utilize its own expertise in identifying and automatically permitting specific recognized applications to have network access.

Online third party services such as SITELOCK™ by SiteLock Inc., or TRUSTE® by TRUSTe, Inc. may attest to the security and absence of malware or objectionable content on a particular website, with such attestation presented visibly to an end user viewing that website through a logo or graphic seal, and other means of presentation, such a presentation having an origin traceable to the attestation source.

Online commerce and auction sites such as AMAZON™ and EBAY™ allow prior purchasers to rank or otherwise review both products and vendors, thereby attesting to the quality of the goods and services purchased, and/or the characteristics of the vendor.

Frequently, digital certificates are used to securely sign digital files, such as executable code, as well as digital documents and media content such as images and videos, to establish ownership and authenticity of the files, and to facilitate detection of tampering of file content. In such a case, typically a given certificate owned by a content owner is traceable back to a root authority that has been granted the rights to generate and assign such certificates, typically for a fee. In this manner, the root authority attests to the genuineness of the certificate and its ownership, and the file owner attests to file ownership through having signed the file. The signing also is evidence of the integrity of the file, indicating that the file has not been tampered with since the file was signed.

In U.S. Pat. No. 8,176,336, attestation is further utilized in regard to establishing and providing assurance of the trust level and integrity of a computing platform, wherein a verifiable trust level is achieved and attested to, of a computing base platform, with the conclusion of trustworthiness being based upon monitoring privileged memory area access attempts plus operations and instructions over a hardware bus during the computing platform boot sequence. U.S. Pat. No. 8,037,318 presents use of attestation in specifying and resolving trust relationships and dependencies between computing system components. An earlier U.S. Pat. No. 7,797,544, presents the use of a certificate chain and digital signatures within the use of attestation for establishing trust between separate computer entities.

In each of the aforementioned examples, attestation provides a means of reusing and propagating the previously accomplished diligence of an attesting entity or "attester", and of making reproducible use of that entity's expertise and the trust vested in that entity.

SUMMARY OF THE INVENTION

The invention pertains to novel attestation-related techniques for creating attestation and assigning it to certain subjects, and applications of attestation for the purpose of supporting and augmenting a policy-based system for mobile handset security and management.

The invention provides systems and methods for expressing, ranking, managing, assigning, and utilizing attestation in information and computing device security and management, and for making use of attestation-related data in regard to application execution, network access and file system access, and access to specific hardware features and capabilities such as microphones, cameras, speakers, and radio transceivers. Applications of the invention as described herein are primarily presented in the context of a policy-based mobile handset security and management system, but the invention is not intrinsically limited to use with mobile handsets and may have much broader applicability in information and computing security and management.

Aspects of the invention pertain to: a multiple-layer instantiation of attestation that provides enhanced security measures; incorporation of Application Attestation Metadata (AAM) bound to applications; specific scopes of activities, permitted activities, and other information that may be presented in the AAM for a given application such as the attester identity; subsequently using attestation metadata within a policy-based system, as well as a chain and hierarchy of attestation authority.

While the system and techniques described herein are often described within the context of mobile handset security, it will become immediately apparent to one skilled in the art that much of what is described can be applied to other areas of information access and computing device security. Neither the description nor the examples used in this present document should be taken as limiting the generality or the applicability of the system and the techniques presented to mobile handsets and wireless networks specifically.

DESCRIPTION OF THE EMBODIMENTS

The following describes preferred embodiments. However, the invention is not limited to those embodiments. The description that follows is for purpose of illustration and not limitation. Other systems, methods, features and advantages will be or will become apparent to one skilled in the art upon examination of the figures and detailed description. It is intended that all such additional systems, methods, features, and advantages be included within this description, be within the scope of the inventive subject matter, and be protected by the accompanying claims.

Aspects of the invention, including attestation and related concepts, can be implemented and utilized to both facilitate and augment such policy-based access control and management systems and methods, including ways in which attestation can be beneficially utilized in mobile computing security and mobile handset management.

Figure 1:
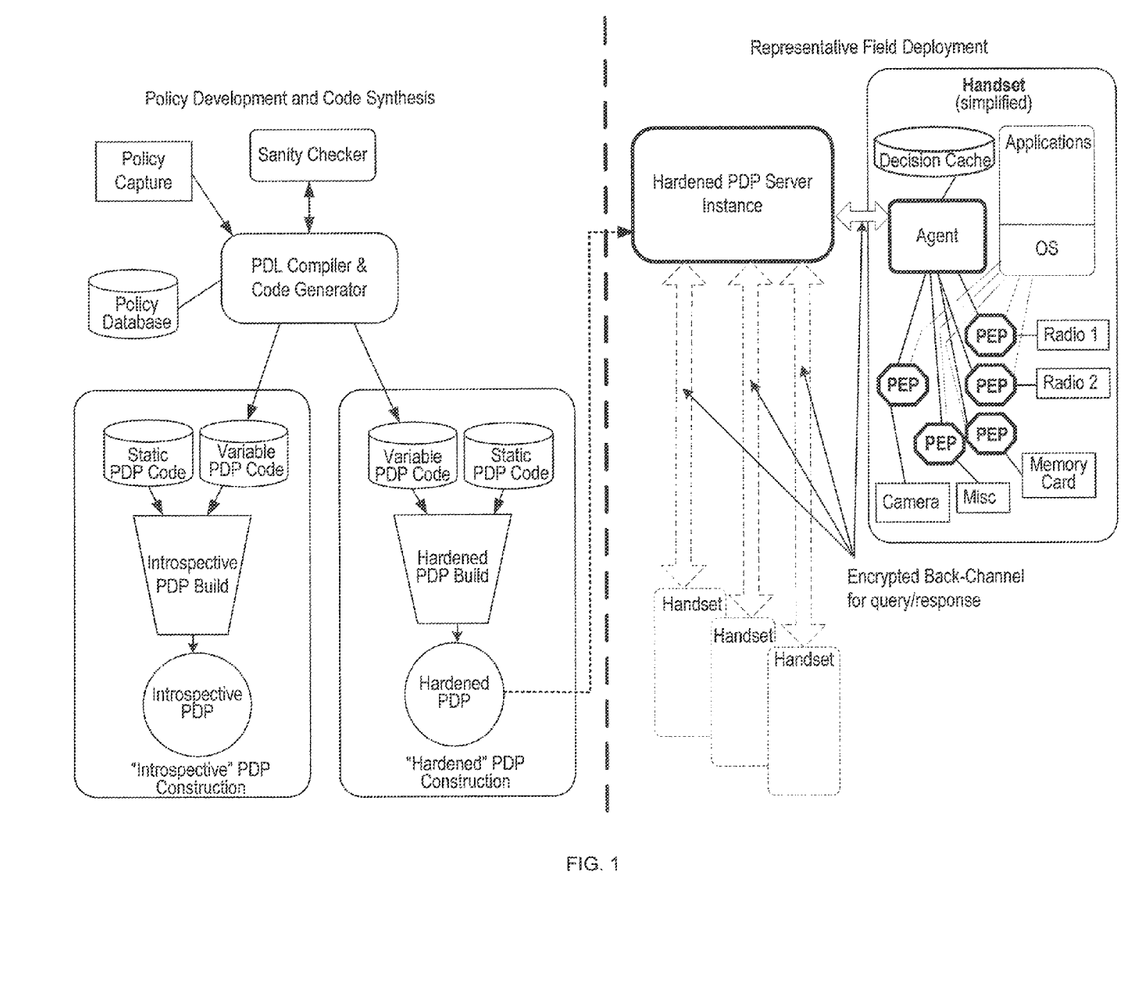
FIG. 1 depicts a schematic representation of one embodiment of the invention for a policy-based access control and management system for mobile handsets.

U.S. patent application Ser. No. 13/945,677, of which this application is a continuation, discloses an invention for policy-based access control and management for mobile computing devices. Aspects of such an invention are summarized in FIG. 1. Particularly notable aspects of the invention are the granularity of control it allows in regard to permitted operations, plus network, file system, and device access on handsets. Furthermore, the invention utilizes one or more policy decision point (PDP) servers that respond to encrypted queries from handsets controlled by a given instance of the invention. These PDP servers may be remote from the handset, or may even be hosted within the handset. The queries typically encapsulate requests for use of specific handset or network-accessible assets, and the PDP response to such a request is then received by the querying handset, with subsequent decisions made by the PDP then enforced by Policy Enforcement Points (PEPs) on the handset.

Figure 2:
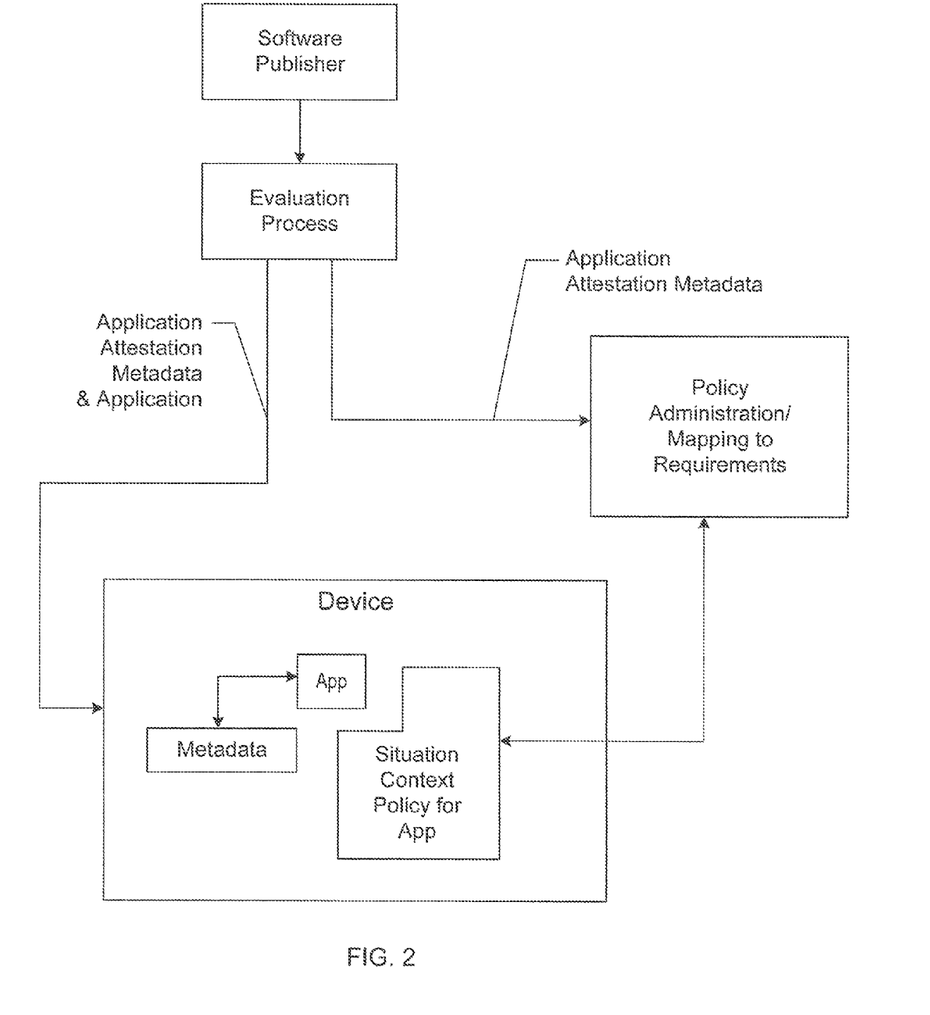
FIG. 2 depicts a schematic representation of one embodiment of the invention for application attestation and its use within a policy-based access control and management system.

FIG. 2 depicts a simplified schematic representation of one embodiment of the invention in which application execution is controlled by a process for generating and subsequently utilizing Application Attestation Metadata (AAM). Omitted from the figure are certain aspects of other embodiments, including multi-level attestation and other details that will be described below.

Figure 3:
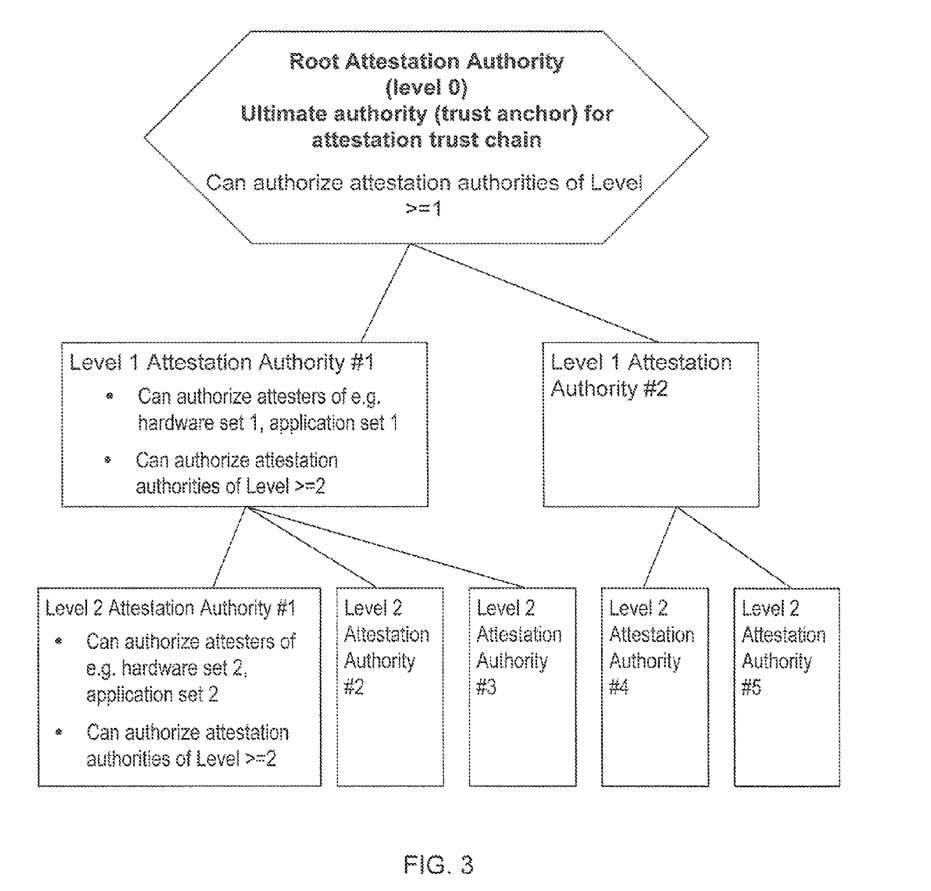
FIG. 3 depicts a representative attestation authority trust chain of one embodiment of the invention.

In a typical use case, a third party "attester" receives an application for evaluation (typically, although not necessarily from the application's publisher). The attester is a trusted party, such as an attestation authority, or one who holds credentials enabling it to perform attestation. The attester may be a publically trusted party, for example an entity that provides security auditing services, or a privately trusted party, for example, a network administrator in charge of corporate computing security. Attester credentials are granted by an "attestation authority". The invention allows for a hierarchy of such authorities leading back to, and traceable to, one or more "root" attestation authorities. A representative diagram of a hierarchy of such authorities in one embodiment of the invention is presented in FIG. 3. This is similar to authorities for digital certificates, and in fact, attestation credentials may be identified and signed with, and even contained within, digital certificates. For example, in the case of X.509 certificates, the AAM may be expressed within one or more extensions of the certificate in accordance with the X.509 specification.

If the application meets acceptability criteria at this stage, such as established benign network access capabilities, and absence of malware, then certain AAM is generated and bound to or otherwise associated with the application, coupled with the signature of the attester. The AAM may include a variety of other details regarding anticipated permissible scope of activities of the application as well as attestation date and other attestation details. The AAM is carried with the application onto the device or otherwise associated with the application.

Figure 4:
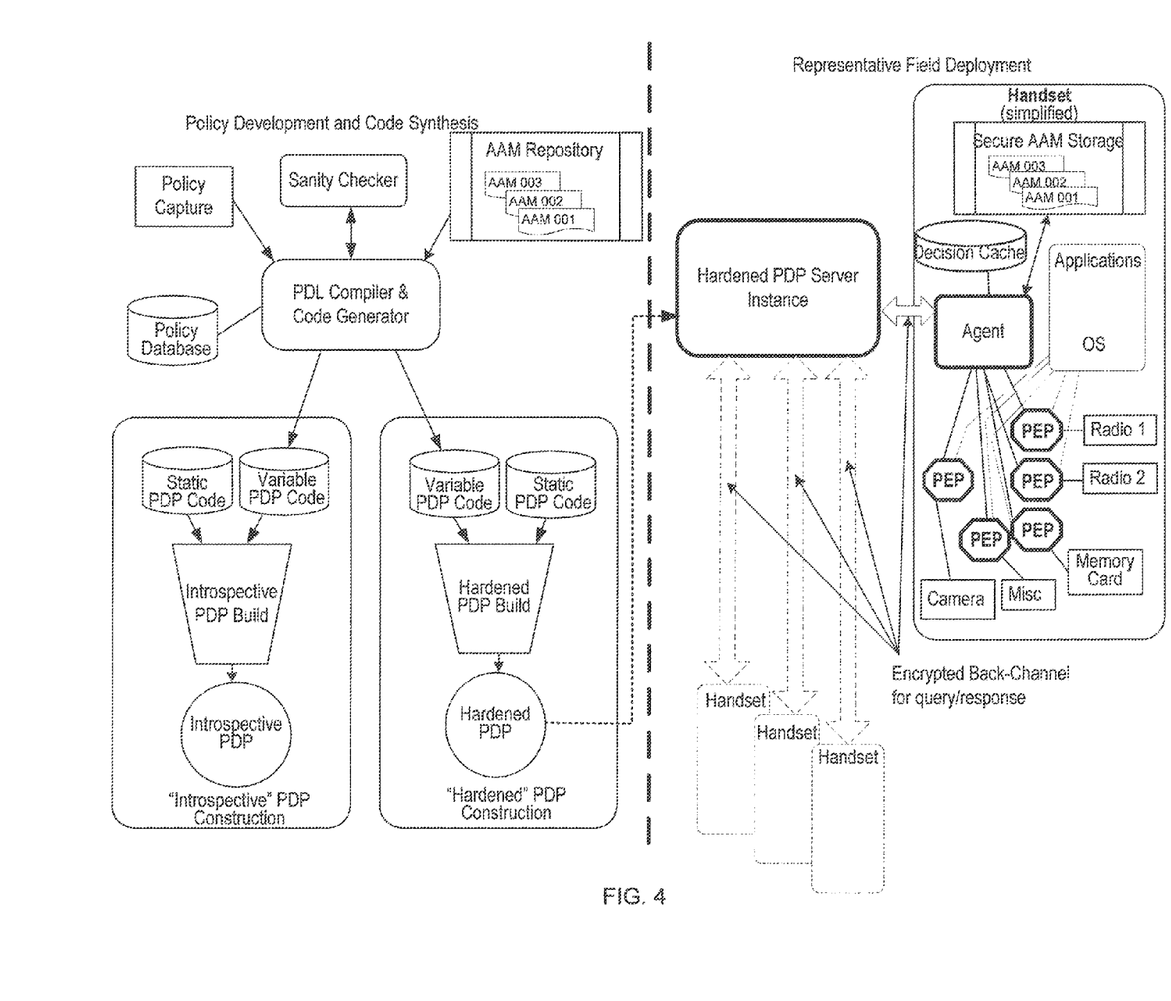
FIG. 4 depicts a schematic representation of one embodiment of the invention for a policy-based access control and management system for mobile handsets with Application Attestation Metadata (AAM) stored on handsets.
Figure 5:
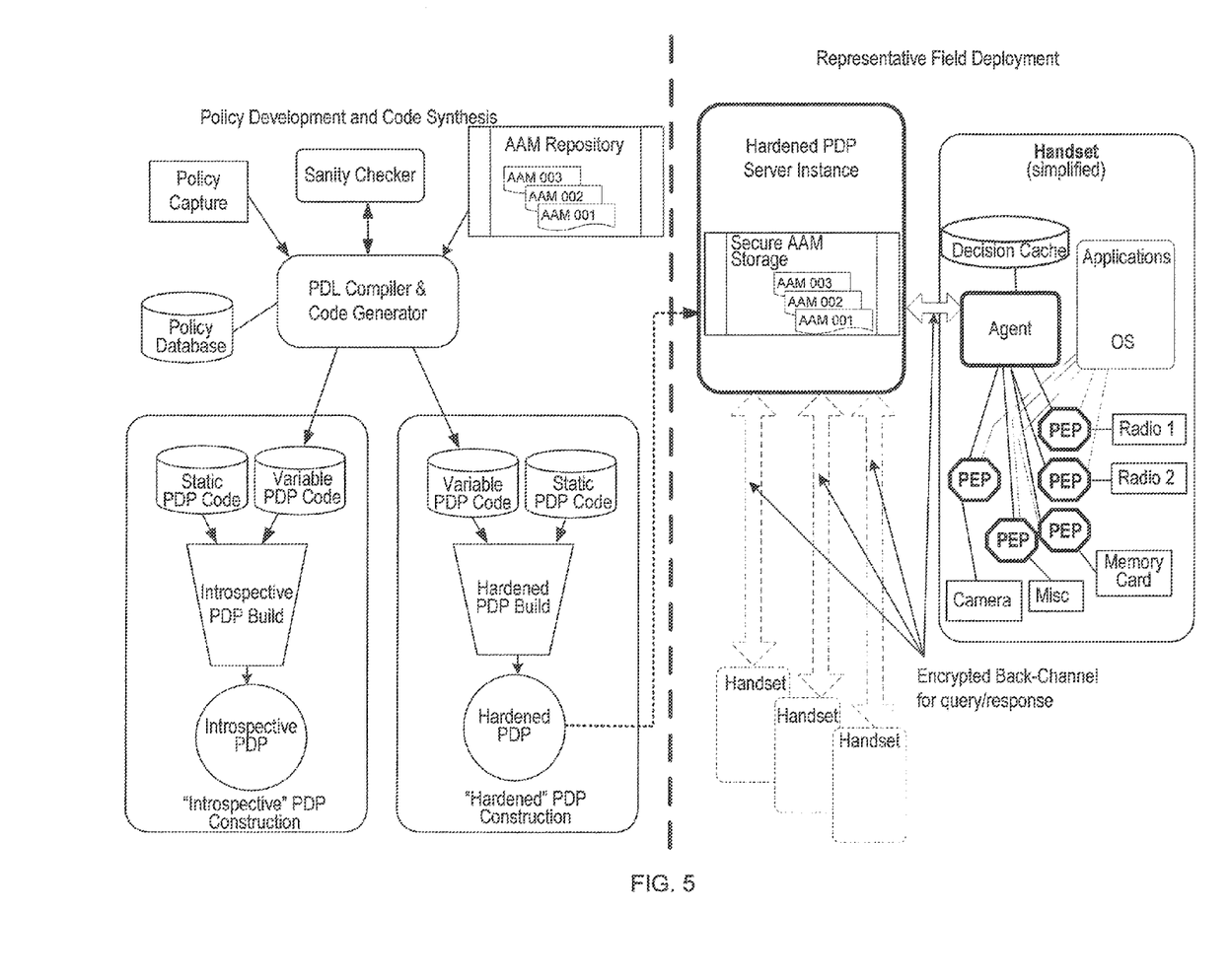
FIG. 5 depicts a schematic representation of one embodiment of the invention for a policy-based access control and management system for mobile handsets with Application Attestation Metadata (AAM) stored on a Policy Decision Point (PDP) Server.
Figure 6:
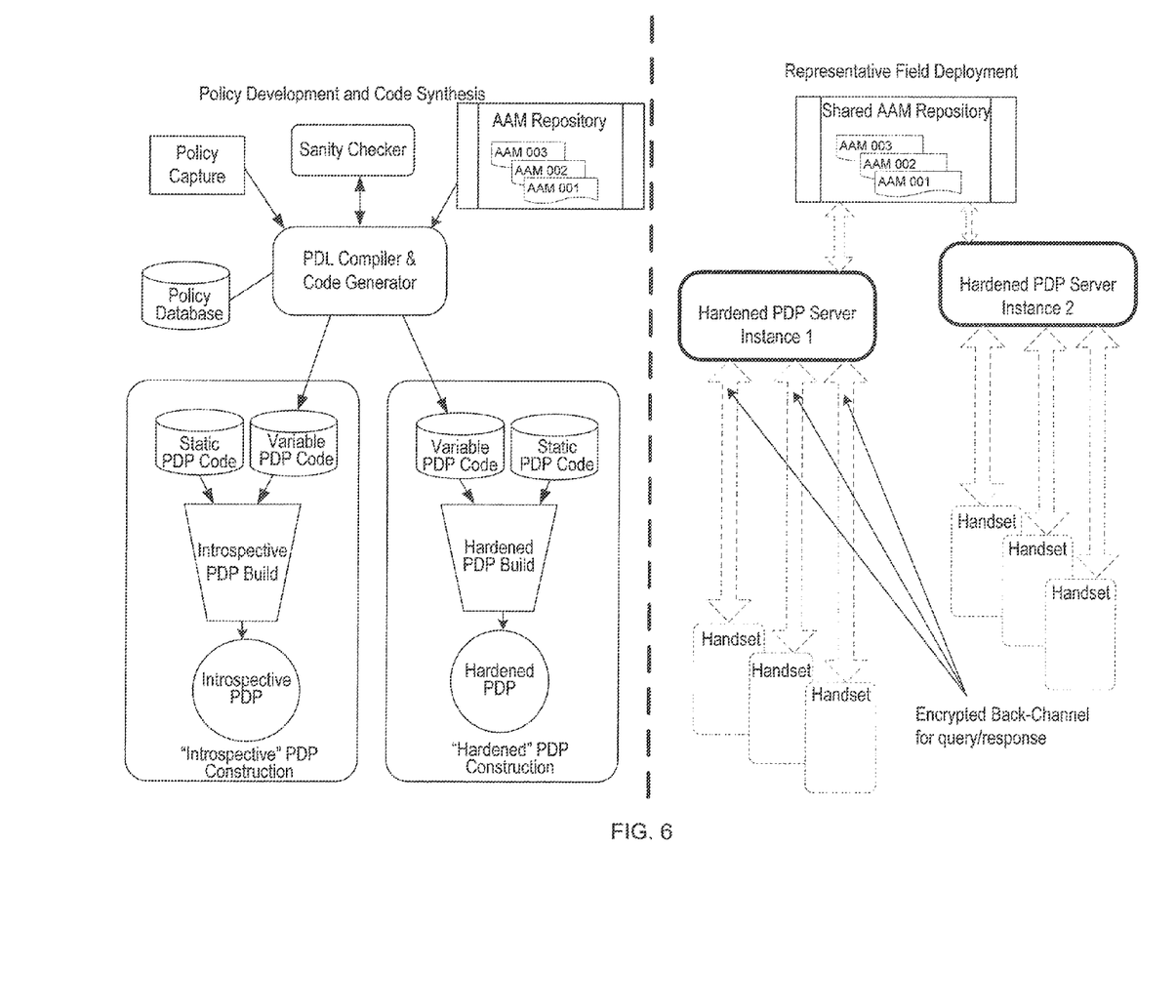
FIG. 6 depicts a schematic representation of one embodiment of the invention for a policy-based access control and management system for mobile handsets with Application Attestation Metadata (AAM) in Remote Storage and shared between multiple PDPs.

With the latter case, the invention is not limited to having AAM resident on the device such as is shown in FIG. 4. As non-exhaustive examples, the AAM may reside within the PDP server (FIG. 5), in some other remote storage (FIG. 6), or via any authenticated remote or local interface (not depicted). In the device-resident and remote-storage cases, the existence of the AAM outside the hardened PDP presents potential security vulnerabilities that can be mitigated through approaches known in the art, such as encryption, challenge/response, and other network security measures. Remote storage allows the sharing of attestation repository resources among multiple PDPs. Additional security for this approach can be provided by shielding AAM repositories and PDPs behind a common firewall while disallowing access to the AAM repository by any non-PDP. The AAM will typically be associated with the application through an index or other means. The AAM is also provided to the policy management framework for use in establishing policies to be used in analysis of queries from handsets to the PDP server(s) (see the aforementioned U.S. Applications 61/718,660, Ser. No. 13/945,677, and 61/673,220 for a more thorough treatment of policy management frameworks in general).

Once the AAM is created, policies can be written that require that the software's behavior is consistent with what was deemed permissible during the evaluation process. It is also an intrinsic requirement that the software be unaltered and otherwise identical to the originally attested-to software. Additionally, the security policy framework provides a rich set of contextual data that the policies can evaluate. This allows policy administrators to specify under which conditions the software is allowed to run, as well as, for example, what resources the software may access, which applications are authorized to be installed, and under what conditions the software's activities must be logged beyond normal log detail levels and log entry composition.

The following table presents simple examples of attestations of specific hardware and software entities, which may then be referenced by policies, by index number or other means. "Real world" entries would typically be much more complex and with a larger number of fields for each index. The AAM with index 003 in the table is an example of a "negative attestation" in that an attester has asserted that an application is known to exhibit malicious behavior. In such a case, a policy could be written to block execution of the application or limit its network access. By enforcing this policy, one embodiment of the invention could serve as an anti-virus or anti-malware measure. "Positive", mixed, or other attestation descriptors are likely depending on desired use and context (e.g., popularity, effectiveness, ease-of-use, emotional satisfaction, compatibility, level of integration with other applications, responsiveness of publisher to issues and feature requests, innovativeness, etc.).

format used for verifying whether a particular software package available for download at a well-known location is free of known viruses and malware, or a standard used for attesting as to the focal length threshold achievable by a particular camera model, or that the threshold is verified with respect to a specific camera before it is shipped from the factory. Publication and use of such standards can allow automated use attestation information, such as in a policy decision point (PDP). These are just a few of many examples that will become immediately apparent to one skilled in the art.

In one embodiment of the invention, policies can be written that require the presence of attestation by a specific attester or group of attesters. Such policies may also utilize other specific content held within the AAM. For example, beyond use of attestation in policies to inform coarse "run" vs. "don't-run" decision making, an application, for example, may be required in a given policy to have attestation from a specific attester or group of attesters, in order to be allowed to have file or network access, or to utilize handset cameras, microphones, or other resources.

In one embodiment, attestation schema could be such that an attestation facility is only approved to a certain level (where that level is associated with a set of attributes or characteristics that parties approved to that level can attest to). An example would be akin to, in lay terms, "level X attesters can attest to camera behavior and microphone behavior". Based upon policy requirements, when an application seeks to install, run, or access a critical resource, a policy enforcement point (PEP) on the device interrupts the flow of execution and consults with a policy decision point (PDP) for a determination of whether the action is permitted to take place (policy decision processing and enforcement are more thoroughly described in U.S. application Ser. No. 13/945,677, of which this application is a continuation).

In one embodiment, attestation policies in the PDP are able to dictate whether or not a program can be installed or executed based on its attestation metadata. If metadata doesn't exist for a program, the program is unattested and can be prevented from installing or running if policies require attestation. If attestation metadata does exist, and the program is allowed to run, but then attempts access that is inconsistent with actions permitted in the recorded metadata, that attempt can be prevented, and the program may be stopped, as this may indicate a "zero day" attack via a

| AAM index | Attester | Created | Expiry | Subject | Attestation |
|---|---|---|---|---|---|
| 001 | Acme Hardware Testing Labs | Dec. 12, 2011 | Dec. 31, 2020 | 802.11x transceiver | No malicious code detected in firmware |
| 002 | Universal Software Testing Inc. | Oct. 1, 2012 | Dec. 31, 2031 | Allworld Maps application | No malicious network access or malware detected |
| 003 | Universal Software Testing Inc. | Oct. 1, 2012 | Dec. 31, 2020 | Omnivore Browser application | Application attempts to access known malicious sites |

In one embodiment of the invention, attestation producers, consumers, or other interested parties may agree on standards by which attestation data is used. For example, entities (producers, consumers, service companies, standards bodies, working groups, research facilities, educational institutes, etc.) could propose or agree upon a standard corrupted program. In other embodiments, secure "sideloading" of applications from approved locations may be supported by pre-provisioning the PDP with AAM data and policies for approved software, or by AAM data otherwise associated with, or attached to, an approved file or source. In other embodiments, the PDP can also be provisioned with policies to govern unapproved and unknown software, so desired behavior can be enforced, taking contextual attributes into account.

Aspects of Application Attestation Security

Aspects of the invention incorporate a significant set of concepts for the purpose of maximizing application attestation security, for preventing tampering with application attestation by malicious parties, and for preventing other malicious or otherwise undesirable activities. An illustrative example explores use of one embodiment of the invention to manage a common handset software platform.

Applications within native execution environments can be thought of as being composed of collections of executable or interpretable data. The term "closure" is used herein in regard to an application to mean the set of "all things executable" that are required to represent the entire application. Understanding closure for applications aids in securing attestation of those applications. In a native LINUX™ operating system environment, for example, the collection constituting closure consists of either a statically linked binary or a dynamically linked binary and associated dynamic loadable ".so" (or "shared object") libraries.

In Google, Inc.'s ANDROID™ operating system, applications additionally have a bytecode-compiled JAVA™ archive component and employ JAVA™ libraries and classes available from various sources including the ANDROID™ framework. Byte compiled code in .apk files is memory mapped into the Dalvik machine instance (the ANDROID™ virtual machine). Dynamic link libraries are memory mapped into their running tasks. Attributes on code segments of mapped .so libraries possess an "execute" attribute. Data segments of .so libraries are not executable. The linked binary in both static and dynamic cases is memory mapped. Again, executable segments possess execute attributes while data segments do not.

Defining the closure of an application as "all things executable" that compose the application allows one to put a bounding box around the application and its potentially shared components (e.g. .so files in Linux), even for those that are dynamically loaded, provided that such components are known in advance and understood to be part of the closure.

Understanding the closure of an application allows the detection of:
1. A change to a dependent .so library: assuming that the closure fingerprints the set of .so libraries.
2. An attempt to dynamically load code: monitor mmap( ) system calls (responsible for mapping a file into memory regions) and identify the file as executable (mprotect( )) or a .apk.
3. An attempt to use unknown dynamic code: monitor mmap( ) and mprotect(PROT_EXEC) and assert that the underlying file is part of the application closure. If the underlying file is not known to be part of the application closure then ability to execute should depend on the general case of whether the application is authorized to load previously unknown code.
4. A change to a system component: if the hash/fingerprint of a .so library being loaded is different from that contained within the closure then a change has been detected to the .so library. The attested-to right for application can then be expressed as "can load modified previously named/known code".

In one embodiment, it may be further desirable to allow system components to be updated without requiring recalculation of the closure, essentially an "on-the-fly closure update". The previous notion also allows definition of an application attestation bundle that is loosely coupled to the operating system, or that is device specific in that the base system can be evaluated separately from the application itself. A more stringent approach of another embodiment is to cast the closure permanently, including base system components. In the latter case, the invention may optionally require permanent presence of shared .so libraries that were present on the base system. Embodiments of the invention can provide for removal of original base system components, for example, in the case of deprecated libraries no longer in use, by a new attestation of an updated base system with a new aggregate attestation.

In one embodiment, the invention can couple attestation of an application and the set of all shared libraries used within a single "binding" attestation representing that closure ("type 1" attestation). Alternatively, in another embodiment, the invention can decouple the attestation of the application from the attestation of .so's or other libraries by providing a separate AAM for each library ("type 2" attestation). In yet another embodiment, these attestations can be coupled together again through a third type of AAM ("type 3" attestation), essentially an aggregate attestation, although in such a case interoperability testing may be required as part of the requirements for aggregate attestation.

Once established, the closure of an application forms the basis for an object that can be attested to, and that an attestation can be bound to. A mechanism is needed at either system or application level to define the relationship between items that were "attested to" by different entities or at different times. In one embodiment, certificates are used for this purpose, in which case an application can be signed and the application "permitted system" authorization can be bound to the system. The chain of trust is rooted via a common certificate authority or via agreement upon recognition and acceptance of attestation data from more than one authority.

Resource Classification in View of Closure

The simplest classification of ANDROID™ components allows closures to be defined as "system" or "non-system". System components include native services or subsystems that act as agents for other ANDROID™ framework capabilities, for example, telephony, virtual keyboard, display, access to stored contacts, etc. Non-system components generally do not have direct access to sensitive system components (e.g., "devices", like character or block special device driver interfaces), nor can they change their identity to gain access. Non-system access to sensitive system resources is brokered via an ANDROID™ system component (agent) acting on behalf of the non-system component. "rootmon" is a special case of classification that singles out the scope, context and resources that can be acted upon while root.

Permitted Scope of Access

Using the simple classification, "system" and "sensitive" resources are identified upon which a closure can operate. In the case of file-type resources, for example device driver files, finer granularity can be defined such as: ioctl( ), mmap( ), mprotect( ), read( ), write( ), open( ), socket( ), and mkdev( ). Classification and labeling of the system objects and enumeration of permitted operations allows policy to be written against closures that attempt to perform operations. This tuple becomes part of the application "attested-to", "authorized" behavior, and having established closure, provides a solid basis for the attestation subject.

Details of Attestation Authorities, Attestation Chains, Attestation Claims, Attestation Agreement/Acceptance In one embodiment of the invention, a set of certificates represents the root of trust in given attestation chains. These can optionally be the same certificates or be rooted in the same trust chains as those employed in defining the base system. An attesting authority has expertise and can "attest to" the behavior of a closure limited by expertise, tool capability, time and cost to investigate. A set of labels can be defined and associated with attestation authorities that describe the limits of their capability. The labeling scheme can be simple, for example "gold", "silver", and "bronze", or more descriptively detailed "gold, network, system, resource input and output," and so on. In use of the invention, opportunities exist for levels and groups of attesters such as carriers, device vendors, device owners, parents, family members, and so on, some groups having potentially overlapping attestation capabilities. Conflicts in attestation can be resolved using the attester hierarchy, and further means to resolve attestation conflicts through a policy owner hierarchy is more thoroughly described in U.S. patent application Ser. No. 13/945,677, of which this application is a continuation.

If an attesting authority wants to accredit "sub-attesters", then a certificate can be issued under the attesting authority. This preserves the chain and provides traceability to the authority of origin. Attestation claims correspond to a labeling scheme and authorized activity for a closure. An attestation authority should not be able to attest to a property for which they do not have suitable expertise. If an application attestation certificate for a closure makes a claim X, then the authority must be certified to have the ability to "attest to X". A device can be configured such that it will accept attestation data according to agreement. Mere existence of a certificate from an attestation authority should not be enough to declare trust in the authorities' claims.

Static "Pristine Device" Versus Dynamic "Post Install" Attestation

In one embodiment, employment of attestation chains and authorities coupled with labeling or recognition within a closure's attestation certificate allows a base system to be "attested to" separately from applications. Further, it allows multiple authorities to be employed, sometimes at different times during the maintenance life cycle of the device. Initial "pristine device" attestation coupled with read-only memory allows the base configuration (e.g., an Android installation including a particular vendor's preloaded applications) to be retested at boot. The initial configuration (e.g., the preloaded applications) of such a base configuration may also be attested to by certain permitted attesters prior to or during the initial device software setup corresponding to this base configuration, with such attestation potentially being a prerequisite for the installation into the base configuration application set. Closure data can be reconfirmed at time of application launch. In a further embodiment, authorization to perform operations on sensitive resources (or even non-sensitive ones) can be checked against attestation data. Post-install attestation can be achieved by chain of trust verification to attestation authority. Whether or not dynamic code and versions of dynamic code can be employed is subject to attestation metadata and the policies referencing it.

Non-Application and OS Entities and Activities that can be Attested to

Beyond application, OS, or other software (code) attestation, there are many other areas in which the invention can be applied, and used. For example, in one embodiment, attestation may be made as to the trustworthiness or security or other characteristics of a WiFi access point or other network connection, or to a specific network or subnet, allowing policies to be written governing the use of attested-to network access. In such a case, a variety of attesters can be considered, such as trusted network owners or other trusted authorities, as well as the device owner and other stakeholders.

Non-executable file content (data) such as images or video, or even streaming content and streaming content sources, as well as websites, access thereto, or other network connections, can be attested to, for example, for their suitability for viewing by specific audiences. Such attestation can then be utilized, for example in policies that screen for permissible audiences, or for non-malicious or otherwise undesirable content.

Similarly, in further embodiments, both physical and virtual (online) locations can be the subjects of attestation, as well as users themselves. For example, sensitive military location may be attested to as such, and policies can then be written to permit access only by users who themselves possess attested-to credentials and appropriate rank.

In other embodiments, certain device hardware such as cameras, microphones, and radio transceivers may similarly be attested to as having undergone functional verification, been subject to quality control, or having been verified as meeting certain tolerances. Attestation can optionally be coupled with a serial number, a MAC address, or other trusted identifier(s), or other screening such that policies can be applied to their permitted usage in various contexts. Such a trusted identifier could then be available through dynamic vector or callback function for use in attestation and subsequent policy writing. The functional capability of a device can be attested to post-manufacture through direct functional testing, and potentially also through testing in the field. For example, camera function to specification can be tested via capture and fidelity verification of test images in a test procedure, resulting in an immediate basis for attestation. In the case of hardware attestation, several sets of attesters can be contemplated, such as device manufacturers, testing and review agencies and services, standards and safety organizations, and government agencies, as well as corporate and individual device owners.

Additional Approaches to Verifying Attestation Integrity and Validity

As examples, some of the measures for preventing a given attestation from being corrupted or "gamed" according to the invention are described herein, as are means for detecting corrupted or invalid attestations. Other mechanisms according the invention are possible, and will become apparent to one skilled in the art. For example, in a further embodiment, a range of quantifiable metrics to detect or "sniff for" exploited or otherwise corrupted attestations and attestation certificates can be applied. Quantities such as age of attestation, number of previously known corrupted attestations by a given attester, time-to-expiry, time since a known threat, and other quantities, either by themselves with individual thresholds serving as "tripwires" to trigger alerts or automatically invalidate attestations, and/or by an aggregate approach with weightings to form a weighted criteria-based attestation corruption detection system. Similarly, other embodiments of the invention may use more active means, such as blacklists, decentralized public key servers, peer-to-peer dissemination of certificate revocations, etc.

Business Methods for Attestation within the Invention

Attestation coupled with a policy-based system presents numerous business opportunities and potential revenue sources. As non-exhaustive examples, attestation keys or other permissions to perform attestation can be provided to attesters for fees, with a root attestation authority having the highest rank, potentially with said fees based on rank or other criteria, and with screening processes applied for acceptability into a given rank. Fees can also be charged for the service of writing policies or policy templates or frameworks that have to do with attestation. In such a way, there can be "Recognized Attestation Authorities" associated with both attestation metadata and the policies making use of it. The fees described can also be for limited durations with fees, for example annual fees for renewal of both attester keys and attestations. In such ways, marketplaces of attestation and policy set authorship can be constituted. Other examples include fee-based web services, wherein candidate applications or other objects are submitted (uploaded) as candidates for attestation by the fee recipient or a related party, with successful approval resulting in a "seal of approval" and digital signing with the attester's approved key. These are merely some examples. Other opportunities and methods to commercially exploit aspects of the invention will become apparent to the user and are considered by the inventors within the scope of the invention itself.

INDUSTRIAL APPLICABILITY

The invention pertains to securing computing devices, including mobile computing devices, and any industry where that may be of value or importance.

What is claimed is:

1. A system to manage and secure computing devices by adjudicated resource decisions comprising:
    a secured policy-based control system having a processor to compute adjudicated resource decisions based on a resource identifier, at least one associated attestation record, and secure, policy-driven conditions for permitted operations on the identified resource, configured to resolve conflicts between attestation records;
    an attestation non-transitory memory coupled to the policy-based control system, to store resource identifiers, associated attestation record and secure, policy-driven conditions for permitted operations on the identified resource;
    a first interface to receive requests for adjudicated resource decisions from computing devices;
    a second interface to retrieve the resource identifier associated with the subject resource decision, where the requesting computing device has no access to the policy-driven conditions used in the adjudication, to retrieve the attestation record associated with the resource identifier and to retrieve the secure, policy-driven conditions for permitted operations on the identified resource from the attestation non-transitory memory;
    a third interface to transmit the resource identifier, associated attestation record and secure, policy-driven conditions for permitted operations on the identified resource to the policy-based control system; and
    a fourth interface, coupled to the policy-based control system to retrieve and to transmit the adjudicated resource decisions to the computing devices.

2. The system of claim 1, wherein attestation record conflicts are resolved using digital certificates and digital signatures.

3. The system of claim 1 wherein attestation conflicts are resolved by applying a directed acyclic graph (DAG) of attesters.

4. A method to manage and secure computing devices by adjudicated resource decisions based on policy-driven condition for permitted operations, the method comprising the steps of:
    receiving a request for adjudication of a resource decision from a computing device where the requesting computing device has no access to the policy-driven conditions for permitted operations;
    receiving a resource identifier, associated attestation records and secure, policy-driven permitted operations on the identified resource;
    resolving any conflict between associated attestation records;
    storing the resource identifier, associated attestation records, and secure, policy-driven permitted operations on the identified resource in a non-transitory memory;
    transmitting the resource identifier, associated attestation records and secure policy-driven conditions for permitted operations on the identified resource to a policy-based control system for adjudication;
    computing an adjudicated resource decision based on the resource identifier, associated attestation record and secure, policy-driven conditions for permitted operations on the identified resource; and
    transmitting the adjudicated resource decision to a computing device.

5. The method of claim 4, wherein attestation record conflicts are resolved using digital certificates and digital signatures.

6. The method of claim 4, wherein conflicts between associated attestation records are resolved by applying a directed acyclic graph (DAG) of attesters.

* * * * *